Dec. 3, 1929.   G. H. BUCHANAN   1,738,280
CYANOGEN CHLORIDE HYDROCYANIC ACID MIXTURE
Filed May 29, 1925
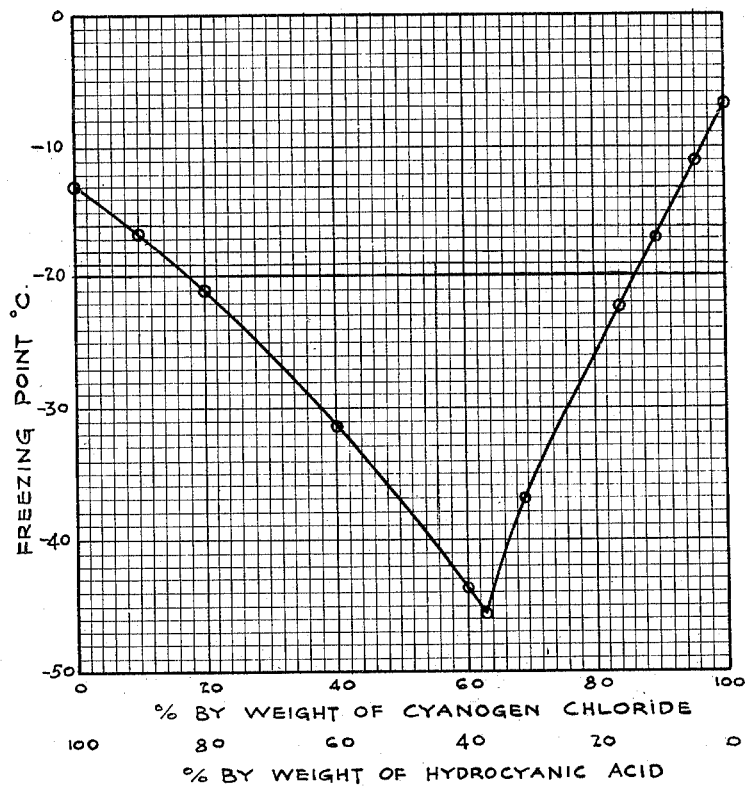
Guy. H. Buchanan.   INVENTOR.
BY   ATTORNEY.

Patented Dec. 3, 1929

1,738,280

UNITED STATES PATENT OFFICE

GUY H. BUCHANAN, OF WESTFIELD, NEW JERSEY, ASSIGNOR TO AMERICAN CYANAMID COMPANY, OF NEW YORK, N. Y., A CORPORATION OF MAINE

CYANOGEN-CHLORIDE HYDROCYANIC-ACID MIXTURE

Application filed May 29, 1925. Serial No. 33,627.

This invention relates to fumigants, more particularly to a mixture containing cyanogen compounds for use in the fumigation of ships, warehouses, dwellings and the like.

In my co-pending Patent No. 1,586,175, dated May 25, 1926, for a fumigant and method of fumigating I have described a fumigant which consists essentially of a mixture of cyanogen chloride and hydrocyanic acid. The mixture may be made by providing liquefied hydrocyanic acid containing a small amount of water, generally from 2% to 10%, and liquid cyanogen chloride, which are mixed together and the acidity thereof adjusted so that the mixture is approximately .01 to .025 normal. Such a mixture is stable, does not separate into its constituents and does not decompose on standing for long periods of time. If receptacles of the proper materials are provided for the mixture, no corrosion thereof takes place and there is practically no chemical action on the fumigant.

I have found that the addition of say 10% of cyanogen chloride to liquid hydrocyanic acid provides a fumigant which is not only extremely toxic because of its cyanogen content but also, on account of the presence of cyanogen chloride, is an irritant affecting the lachrymal glands of any individuals in the neighborhood thereof a considerable time before the concentration of the mixture assumes lethal proportions and thereby prevents accidental fatalities. My fumigant, therefore, is very effective to kill insects and animal pests, at the same time minimizes the danger of killing human beings during fumigation therewith.

Fumigation with mixtures of this type has assumed considerable importance in various ports where it is desired to fumigate entire ships, parts thereof, or warehouses in which goods, shipped from various parts of the world, are stored. Fumigation with cyanogen chloride-hydrocyanic acid mixture has been adopted officially in the Pan American Sanitary Code and its application is spreading to practically all the ports of the world. As many of the important ports are located in the temperate zone where the temperatures during the winter may go down below zero degrees F., it is essential that the fumigant be not only effective during the hot weather but also during the cold. Since the effect of cyanogen chloride-hydrocyanic acid mixtures is dependent upon the volatility thereof, it is apparent that with a decrease of temperature, the effectiveness of the fumigant is impaired, especially where the ingredients thereof are likely to freeze. Cyanogen chloride has a freezing point of approximately $-7°$ C. and hydrocyanic acid has a freezing point of approximately $-13°$ C. Under such conditions it will be seen that either of these fumigants would not operate effectively at temperatures below, say, $-10°$ C., which is very often attained in a number of the important ports.

In view thereof it is among the objects of this invention to provide a fumigant of the cyanogen type which shall have a sufficiently low freezing point so that it may be rapidly and effectively utilized for the fumigation of various enclosures at all times, especially during cold weather.

In carrying out the objects of my invention, I performed a series of experiments to determine the effect upon the freezing point of changes in the proportions of cyanogen chloride and hydrocyanic acid in mixtures thereof. I prepared sulphur-free hydrocyanic acid which was allowed to stand over granular calcium chloride for 24-hours and then distilled. Cyanogen chloride was redistilled over calcium chloride to remove the last traces of water and mixtures of varying compositions were prepared from these dehydrated, pure materials and the freezing points of the said mixtures were determined in a bath of solid carbon dioxide and ether.

The results of these experiments are given below:

| Mol percent of— | | Weight percent of— | | Freezing point |
|---|---|---|---|---|
| CNCl | HCN | CNCl | HCN | |
| | | | | Deg. C. |
| 0.0 | 100.0 | 0.0 | 100.0 | −12.8 |
| 4.6 | 95.4 | 10.0 | 90.0 | −16.5 |
| 9.8 | 90.2 | 20.0 | 80.0 | −20.7 |
| 22.6 | 77.4 | 40.0 | 60.0 | −31.3 |
| 38.8 | 61.2 | 60.0 | 40.0 | −43.8 |
| 41.0 | 59.0 | 61.4 | 38.6 | −45.5 |
| 50.0 | 50.0 | 69.3 | 30.7 | −37.0 |
| 70.0 | 30.0 | 86.1 | 13.9 | −22.2 |
| 80.0 | 20.0 | 90.1 | 9.9 | −17.0 |
| 90.0 | 10.0 | 95.4 | 4.6 | −11.0 |

In the accompanying drawing constituting a part hereof, the single figure is a diagram showing the curve obtained by plotting the results set forth in the above table.

The temperature in each case was that at which the first crystals appeared and from the accompanying diagram it will be noted that a eutectic mixture containing approximately 61.4% by weight of cyanogen chloride dissolved in hydrocyanic acid had a minimum freezing point at approximately −45.5° C. The freezing points of all the various mixtures of cyanogen chloride and hydrocyanic acid are lower than the freezing points of the major ingredients thereof.

The mixtures of cyanogen chloride and hydrocyanic acid containing water, as is the case in commercial practice, have somewhat modified freezing points from those given in the table and diagram. For instance, a mixture containing 15% cyanogen chloride and 4% water in hydrocyanic acid has a freezing point of −19.3° C.

It will be noted that various mixtures within a wide range of composition and having extremely low freezing points may be made, but generally in practice, since hydrocyanic acid is somewhat more toxic than cyanogen chloride, I prefer to use mixtures which lie on the left of the eutectic point of the diagram. Such mixtures contain more than 38.6% of hydrocyanic acid and the freezing points range between −13° and −45.5° C., although in practically all cases such mixtures would be used that the freezing points would be between −18° C., which is equivalent to 0° F. and the eutectic point, −45.5° C. However, it is rarely ever necessary or advisable to utilize a mixture having a freezing point as low as the eutectic mixture and I have found that in practically all cases mixtures freezing between −18° C. and −30° C., containing approximately 60% or more of hydrocyanic acid have sufficiently low freezing points for general use. If desired, I may of course utilize mixtures lying outside of these limits, depending upon the conditions of fumigation and these mixtures may be modified by the addition of other ingredients, depending upon circumstances. Mixtures of liquid hydrocyanic acid and cyanogen chloride are more stable than liquid hydrocyanic acid or cyanogen chloride alone, and small amounts of cyanogen chloride tend to prevent decomposition of hydrocyanic acid.

What I claim is:

1. A fumigant comprising a mixture of cyanogen chloride and hydrocyanic acid in the liquid state, the freezing point of said mixture being between approximately −18° C. and −46° C., and containing from about 17% to about 61% cyanogen chloride.

2. A fumigant comprising a mixture of cyanogen chloride and hydrocyanic acid in the liquid state, the freezing point of said mixture being between approximately −18° C. and −30° C., and containing from about 17% to about 39% cyanogen chloride.

3. A fumigant comprising a mixture of cyanogen chloride and hydrocyanic acid in the liquid state, the freezing point of said mixture being lower than the freezing points of both of the ingredients thereof, and from which a eutectic mixture containing approximately 61.4% cyanogen chloride and approximately 38.6% hydrocyanic acid may be separated.

4. A fumigant comprising a mixture of cyanogen chloride and hydrocyanic acid in the liquid state, the freezing point of said mixture being between approximately −18° C. and −46° C. and the amount of hydrocyanic acid in the mixture being in excess of 38.6%, the cyanogen chloride content being not less than about 17%.

5. A fumigant comprising a mixture of cyanogen chloride and hydrocyanic acid in the liquid state, the freezing point of said mixture being between approximately −18° C. and −30° C. and the amount of hydrocyanic acid in the mixture being in excess of 60%, the cyanogen chloride content being not less than about 17%.

6. A fumigant comprising a eutectic mixture of cyanogen chloride and hydrocyanic acid in the liquid state, containing approximately 61.4% cyanogen chloride and approximately 38.6% hydrocyanic acid, and having a freezing point of approximately −46° C.

In testimony whereof, I have hereunto subscribed my name this 25th day of May 1925.

GUY H. BUCHANAN.